US012129159B2

(12) United States Patent
Sukalski et al.

(10) Patent No.: US 12,129,159 B2
(45) Date of Patent: Oct. 29, 2024

(54) SYSTEMS AND METHODS FOR MODULAR CARRIAGE WIDTH ADJUSTMENT

(71) Applicant: Illinois Tool Works Inc., Glenview, IL (US)

(72) Inventors: Andrew Sukalski, Fairmont, MN (US); Thomas H. Johnson, Winnebago, MN (US); Kevin Detert, Fairmont, MN (US); Cory Hainy, Fairmon, MN (US)

(73) Assignee: Illinois Tool Works Inc.

( * ) Notice: Subject to any disclaimer, the term of this patent is extended or adjusted under 35 U.S.C. 154(b) by 0 days.

(21) Appl. No.: 18/093,065

(22) Filed: Jan. 4, 2023

(65) Prior Publication Data

US 2023/0234820 A1 Jul. 27, 2023

Related U.S. Application Data

(60) Provisional application No. 63/303,603, filed on Jan. 27, 2022.

(51) Int. Cl.
*B66F 9/14* (2006.01)

(52) U.S. Cl.
CPC .................................... *B66F 9/14* (2013.01)

(58) Field of Classification Search
CPC ........ B66F 9/07504; B66F 9/075; B66F 9/12; B66F 9/14
See application file for complete search history.

(56) References Cited

U.S. PATENT DOCUMENTS

| | | | | |
|---|---|---|---|---|
| 2,360,407 | A | 10/1944 | Dunham | |
| 11,608,256 | B1 * | 3/2023 | Hamlik | B66F 9/183 |
| 2014/0262552 | A1 * | 9/2014 | Santi | G01G 19/083 177/1 |
| 2015/0093216 | A1 | 4/2015 | Pangrazio | |

FOREIGN PATENT DOCUMENTS

| | | |
|---|---|---|
| DE | 3050304 | 12/1982 |

OTHER PUBLICATIONS

Int'l Search Report and Written Opinion Appln No. PCT/US2023/060381 mailed May 9, 2023.

* cited by examiner

*Primary Examiner* — Diem M Tran
(74) *Attorney, Agent, or Firm* — MCANDREWS HELD & MALLOY

(57) ABSTRACT

The present disclosure describes a modular carriage system that includes one or more modular pieces to expand one or more dimensions of a base carriage plate. The modular pieces and/or the base carriage plate may include, and/or be configured to receive, mounting hardware to secure the modular pieces to the base carriage plate. In some examples, multiple modular pieces can be stacked together to incrementally increase the one or more dimensions.

18 Claims, 9 Drawing Sheets

SYSTEMS AND METHODS FOR MODULAR CARRIAGE WIDTH ADJUSTMENT

RELATED APPLICATIONS

The present application claims the benefit of, and priority to, U.S. Provisional Application No. 63/303,603, filed Jan. 27, 2022, entitled "Systems And Methods For Modular Carriage Width Adjustment." The complete subject matter and contents of App. Ser. No. 63/303,603 are incorporated herein by reference in their entireties.

BACKGROUND

Load handling fixtures (e.g., lifting forks) can be mounted to a base plate of a standard carriage to raise an object by a lift truck. Conventional carriage plates are defined by fixed dimensions, thus the size and/or type of lift truck that can receive a given carriage plate is fixed. Moreover, the distance between load handling fixtures is set, limiting load handling fixture mounting arrangements. If a dimension of the carriage plate is needed for a given application, conventional systems require the removal of the given carriage plate and replacement with another carriage plate. This requires substantial time, effort, and costs associated with making and storing multiple carriage plates.

Accordingly, there is a need for a carriage plate with one or more modifiable dimensions.

SUMMARY

Disclosed are systems and methods for a modular lift truck carriage system. For example, a modular carriage system can be configured to receive one or more modular pieces in order to expand one or more dimensions of a base carriage plate (e.g., a width of the carriage plate). The modular pieces and/or the base carriage plate may include, and/or be configured to receive, mounting hardware (e.g., fasteners, plates, screws, welding, etc.) to secure the modular pieces to the base carriage plate. In some examples, multiple modular pieces can be stacked together to incrementally increase the one or more dimensions of the carriage plate, to accommodate a variety of load handling fixtures, attachments, and/or mounting to various lift trucks.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1A:
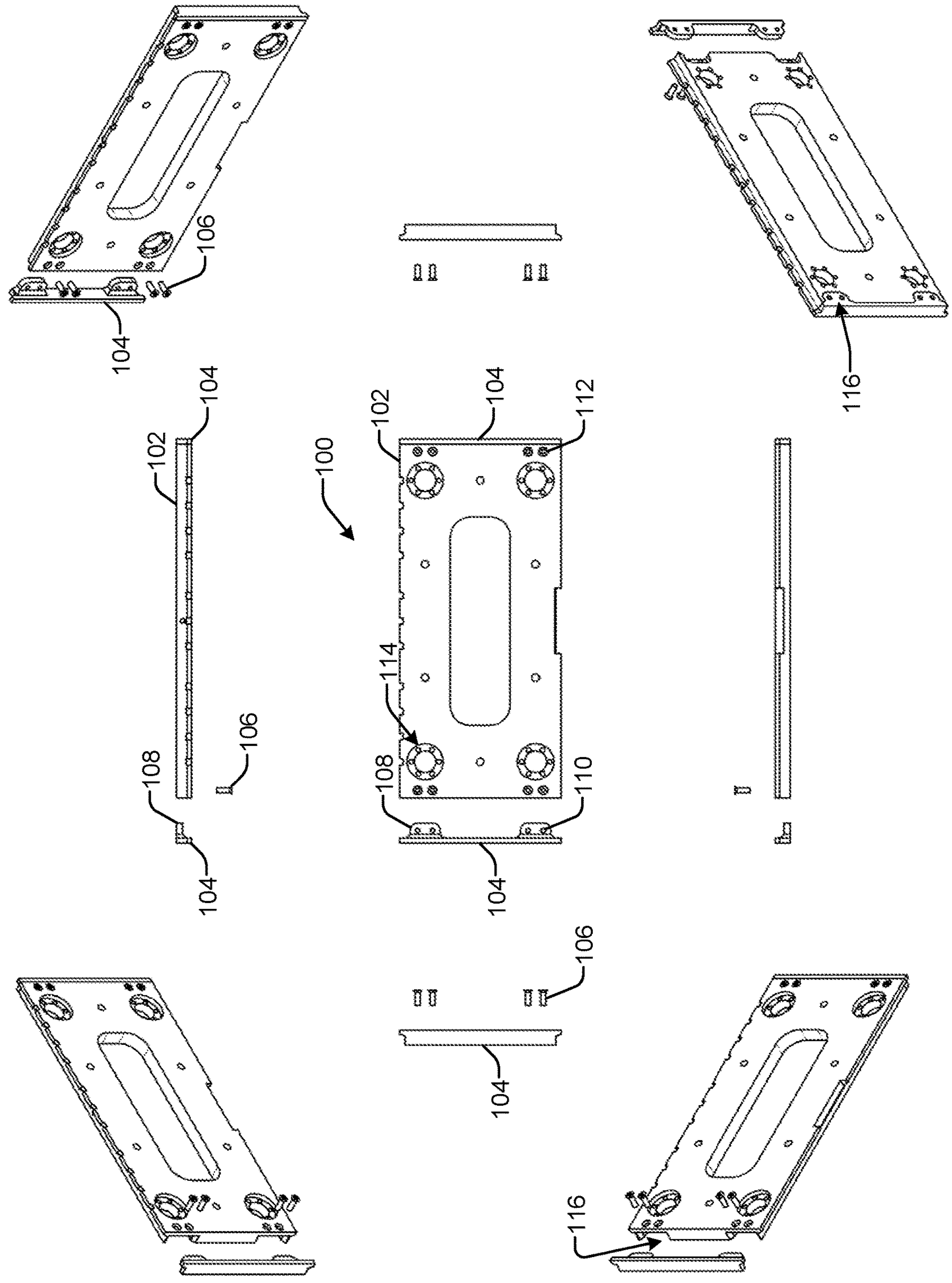
FIG. 1A illustrates an example modular carriage system, in accordance with aspects of this disclosure.

The present disclosure describes an example modular carriage system. In some examples, the modular carriage system includes a base carriage plate having a fixed size. The base carriage plate is configured with one or more mounting areas and/or mounting features to receive a complimentary one or more modular pieces. The modular pieces can be added to an end of the base carriage plate to expand one or more dimensions of the carriage plate, such as the horizontal width of the plate. In some examples, the modular pieces can alter a shape or size of the carriage plate to accommodate a variety of attachments and/or applications. The modular pieces and/or the base carriage plate may include, and/or be configured to receive, mounting hardware to secure the modular pieces to the base carriage plate. In some examples, multiple modular pieces can be stacked together to incrementally increase the one or more dimensions.

Conventional forklift carriages are manufactured with specific dimensions, such as the width, to accommodate specific applications. For example, a carriage may have a specific, and fixed, width designed to hold specific forks, lifts, and/or attachments, as a list of non-limiting examples. To accommodate different applications, current practice is to design and manufacture a newly machined plate with varying dimensions suited for each application. For example, the Industrial Truck Association (ITA) defines standard widths for some carriages (e.g., Class II products). Thus, to satisfy regulatory requirements yet service a variety of loading applications, operators are forced to maintain carriage inventory of multiple sizes. As a result, any change of application requires removal of an entire forklift carriage and replacement with a desired forklift carriage, also storage of the various carriages, as well as the cost and process required to manufacture the many carriages.

This disclosure provides systems and methods for a modular carriage system that includes a base carriage plate configured with one or more adjustable dimensions. For example, the base carriage plate can receive one or more modular pieces to expand and/or change the size and/or shape of the carriage plate or carriage. As a result, operators employing the disclosed system can be more agile in production as well as serve a more diverse market through flexible mounting options.

Advantageously, the disclosed system allows for straightforward adjustment of a carriage (e.g., base carriage plate) width by adding, removing, and/or replacing modular pieces onto one or more ends or edges of the carriage and/or base plate of a modular carriage system. As a result, a carriage width can be changed, after manufacture and/or assembly, without the need for recalibration of the system and/or attachments, the forklift, etc. This offers increased flexibility at a reduced cost, with a reduced number of unique parts.

In disclosed examples, a modular carriage system includes one or more modular pieces and a base carriage plate configured to removably receive the one or more mounting pieces at an end of the base carriage plate, wherein the one or more modular pieces expand one or more dimensions of the base carriage plate.

In some examples, the one or more modular pieces include mounting hardware to secure the one or more modular pieces to the base carriage plate. In examples, the mounting hardware includes one or more of a fastener, a screw, a bolt, a plate, or a weld.

In some examples, one or more fasteners extend through the one or more modular pieces and mate with one or more holes of the base carriage plate.

In some examples, one or more plates are secured to a surface of the one or more modular pieces and to a surface of the base carriage plate, the one or more plates secured to the one or more modular pieces of the base carriage plate by one or more screws. In some examples, mounting hardware includes one or more extensions configured to mate with a corresponding area of the base carriage plate.

In some examples, a first modular piece of the one or more modular pieces is secured to a first side of the base carriage plate and a second modular piece of the one or more modular pieces is secured to a second side of the base carriage plate. In some examples, the first side of the base carriage plate is opposite the second side.

In some examples, the first side and the second side of the base carriage plate are parallel. In some examples, the first side is generally perpendicular to the second side of the base carriage plate.

In some examples, two or more modular pieces are secured to each other and the base carriage plate at a first side of the base carriage plate.

In some disclosed examples, a modular carriage system includes a plurality of modular pieces comprising mounting hardware, and a base carriage plate comprising an area configured to receive and secure the plurality of modular pieces to the base plate via the mounting hardware, wherein the one or more modular pieces expand one or more dimensions of the base carriage plate.

In some examples, the plurality of modular pieces are secured to vertically oriented ends of the base carriage plate to extend a horizontal profile of the base carriage plate.

In some examples, the mounting hardware of the plurality of modular pieces comprises one or more extensions extending from a surface of the plurality of modular pieces, the one or more extensions configured to mate with the area of the base carriage plate.

In some examples, the modular carriage system is configured to mount to a lift truck attachment system for a lift truck. In some examples, the base carriage plate is configured to support one or more load handling fixtures.

In some examples, the modular carriage system is configured to support a side-shifter to move the one or more load handling fixtures horizontally. In some examples, the one or more modular pieces are configured to house one or more of sensors, wiring or electronics.

Turning now to the figures, FIG. 1A shows an example modular carriage system 100 or carriage plate where a base carriage plate 102 is configured to include one or more features and/or machined areas 116 to receive and secure one or more modular pieces 104. For example, the one or more modular pieces 104 are configured to attach to one or more sides of the base carriage plate 102. As shown in FIG. 1A, the modular pieces 104 are symmetrical vertically which allows them to be used on one or both of the left and right side of the base carriage plate 102. In addition to a front view of the system 100 and base carriage plate 102, top, bottom, side, and perspective front views are also provided.

The modular pieces 104 can be inserted into a slot or void machined in a side, bottom, and/or extension 116 of the base carriage plate 102. Once in place, mounting hardware, such as extension members 108 of the modular pieces 104, can receive a fastener 106 (e.g., a screw, a bolt, a stud, a post, a weld, etc.), which enters the base carriage plate 102 via one or more holes 112, and is secured to a hole 110 on or within the extension member 108. In some examples, one or more of the holes are threaded to receive a threaded screw.

In disclosed examples, the modular pieces may be attached to the lateral ends of the base carriage plate to expand the horizontal profile of the carriage plate. The increased profile can accommodate larger load handling fixtures (e.g., loading forks for a forklift). In some examples, the mounting pieces may be of a similar length, width, and/or depth as the corresponding dimensions of the carriage plate. In some examples, one or more dimensions of the mounting pieces are varied, such that some or all of one or more dimensions is smaller than or greater than the corresponding dimensions of the carriage plate. This allows for the modular pieces to be designed for specific types of load handling fixtures, secured to a variety of types of masts or load carriages of a forklift, and/or incorporate sensors, indicia, and/or other features and/or enabling devices (e.g., a weighing device, a side-shifter, a forklift scale, attachments, etc.). In some examples, the modular pieces are interchangeable, and can be removed and replaced with any suitable modular piece with complimentary mounting hardware. In some examples, the modular pieces provide flexibility and/or space for sensors, wiring, electronics, information or identification plates, as a list of non-limiting examples.

Although shown as generally rectangular, the modular pieces 104 can have a variety of sizes and/or shapes to accommodate a variety of load handling fixtures (e.g., for a forklift) and/or carriage mounts (e.g., to a forklift). In some examples, the base carriage plate 102 is configured to house one or more sensors within a sensor mounting area 114. Through such an area, one or more fasteners and/or bolts may be used to secure the base carriage plate 102 to a mounting plate of a forklift or lift truck (see, e.g., FIG. 5).

Figure 1B:
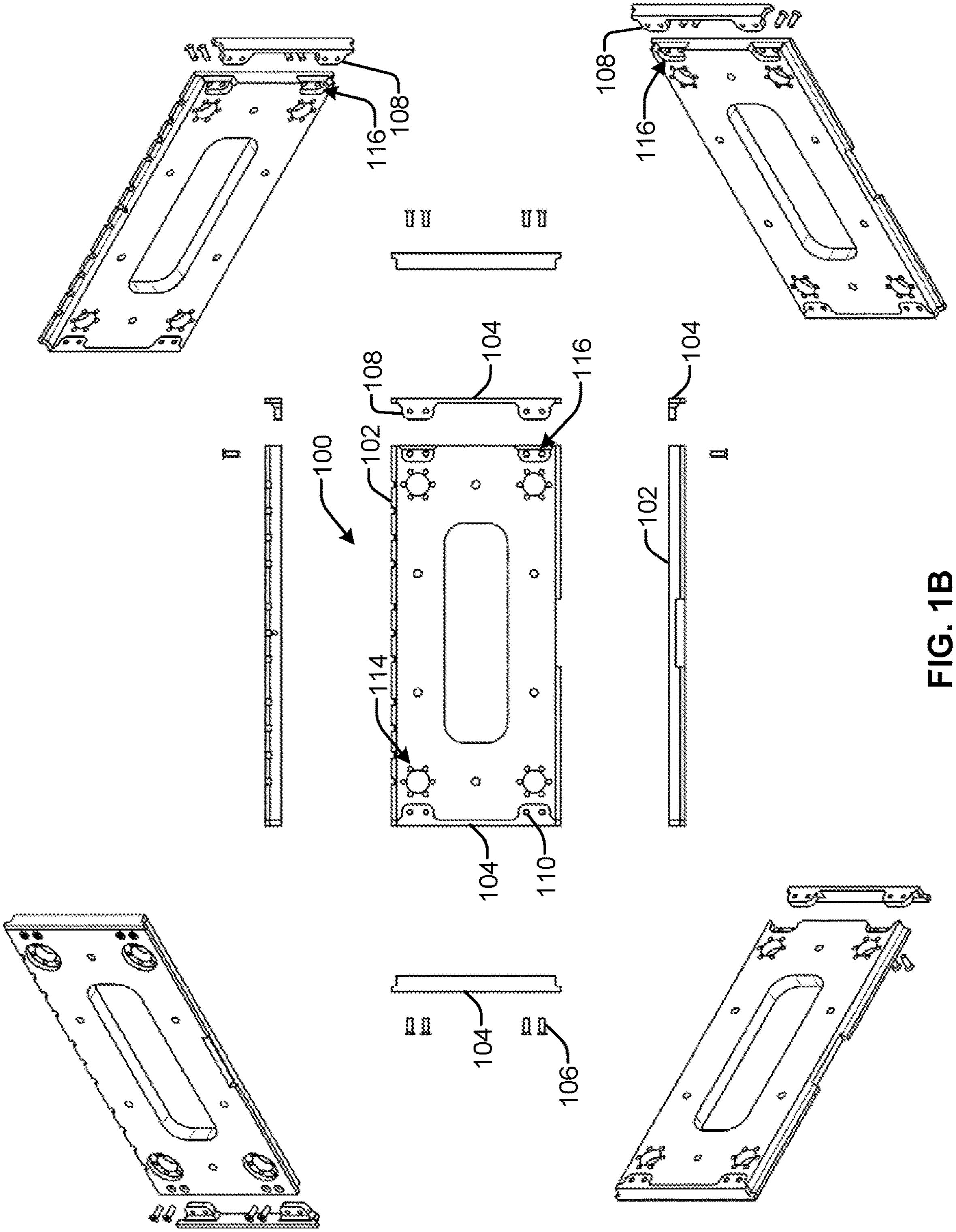
FIG. 1B illustrates a rear view of the example modular carriage system of FIG. 1A, in accordance with aspects of this disclosure.

FIG. 1B shows a rear view of the base carriage plate 102. In addition to a rear view of the system 100 and base plate carriage 102, top, bottom, side, and perspective rear views are also provided.

Figure 2A:
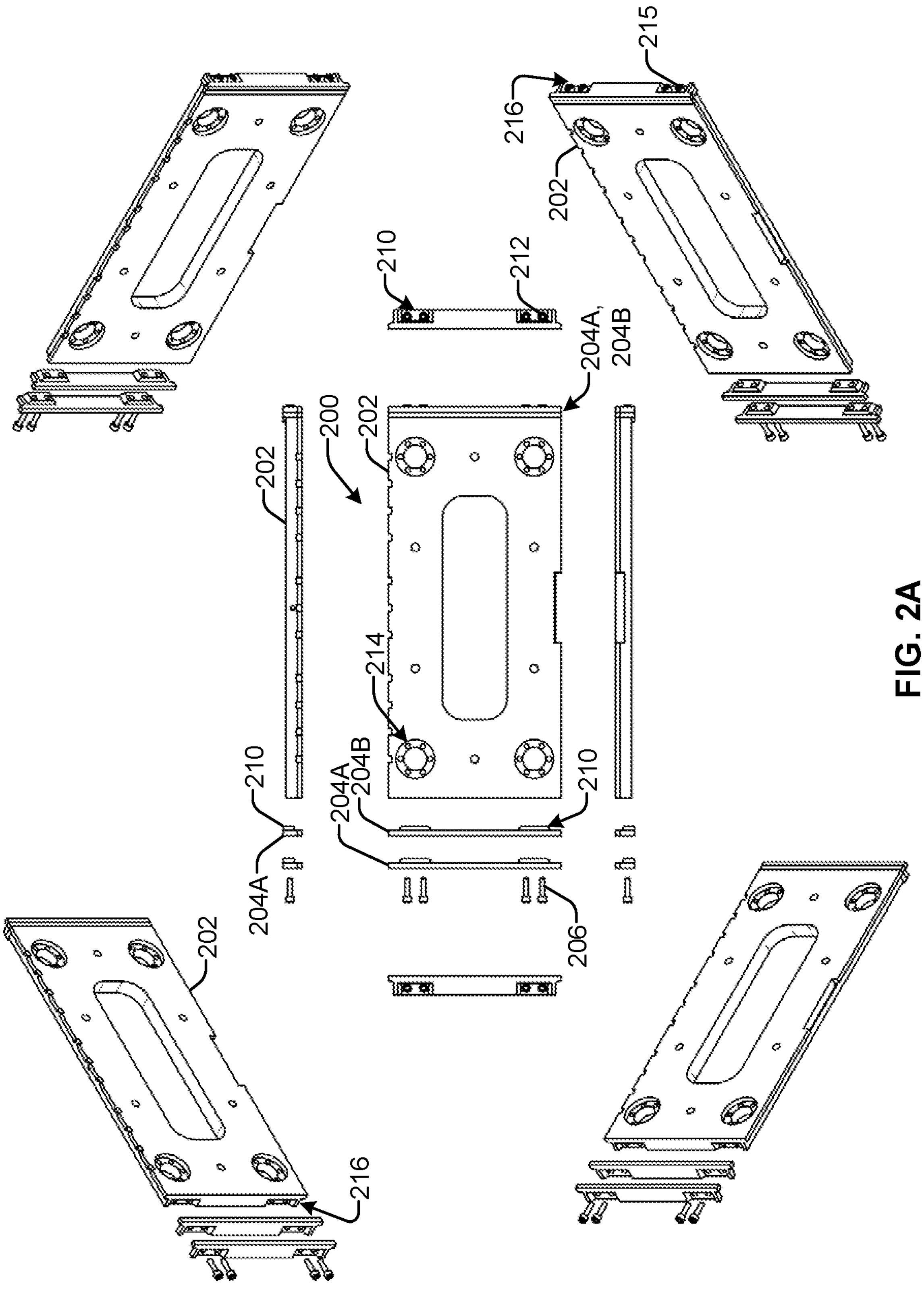
FIG. 2A illustrates another example modular carriage system, in accordance with aspects of this disclosure.

FIG. 2A shows another example modular carriage system 200 with a base carriage plate 202 configured to receive multiple modular pieces 204, such as in a stack, to allow for increment expansion of the lateral dimensions of the base carriage plate 202.

As shown, the base carriage plate 202 is configured to include one or more machined areas 216, slot or void machined in a side, and/or bottom, to receive and secure first and second modular pieces 204A, 204B. For example, each modular piece includes an extension 210 designed to mate with the machined areas 216. One or more holes 212 pass through the extension 210 to accommodate one or more fasteners 206 (e.g., a screw, a bolt, a stud, a post, a weld, etc.) to secure the modular piece to the base carriage plate 202 at machined area 216, which can include one or more holes 215 (e.g., threaded) and/or bolts extending therefrom.

In some examples, multiple modular pieces can be arranged as a stack to incrementally increase the lateral dimensions of the system 200. As shown, a first modular piece 204B is in contact with the base carriage plate 202, and a second modular piece 204A is stacked against the first modular piece 204B. For example, the extension 210 extending from the modular piece 204B creates an impression on the opposing side, which can mate with an extension of modular piece 204A. This arrangement provides stability in multiple directions. A fastener 206 can be inserted through a hole 210 of each modular piece 204A, 204B to secure both to the base carriage plate 202 via holes 215. Although shown as two modular pieces attached to both sides of the base carriage plate 202, a single modular piece may be used, or three or more modular pieces may be attached.

Although illustrated as two identical modular pieces 204A and 204B, in some examples the modular pieces have one or more different features. For instance, a length, width, height, shape, orientation, material composition, mounting hardware, mounting arrangement, and/or a configuration to receive an attachment can be different, as a list of non-limiting options.

As shown in FIG. 2A, the modular pieces 204 are symmetrical vertically which allows them to be used on one or both of the left and right side of the base carriage plate 202. In some examples, the modular pieces on opposing sides may be of a different size, shape, orientation, stacked in a different number. In some examples, the base carriage plate 202 is configured to house one or more sensors within a sensor mounting area 214.

Figure 2B:
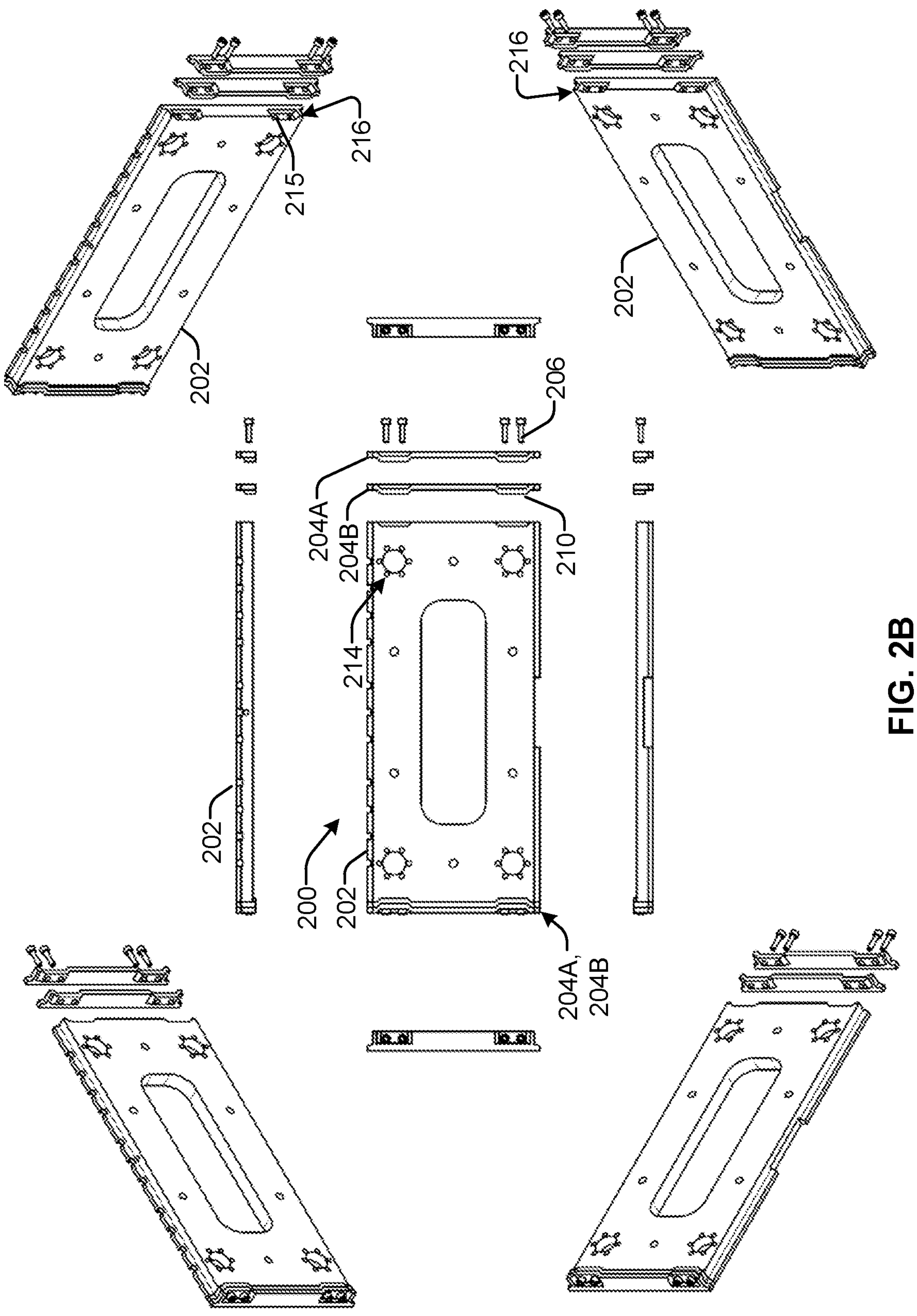
FIG. 2B illustrates a rear view of the example modular carriage system of FIG. 2A, in accordance with aspects of this disclosure.

FIG. 2B shows a rear view of the base carriage plate 202.

Figure 3A:
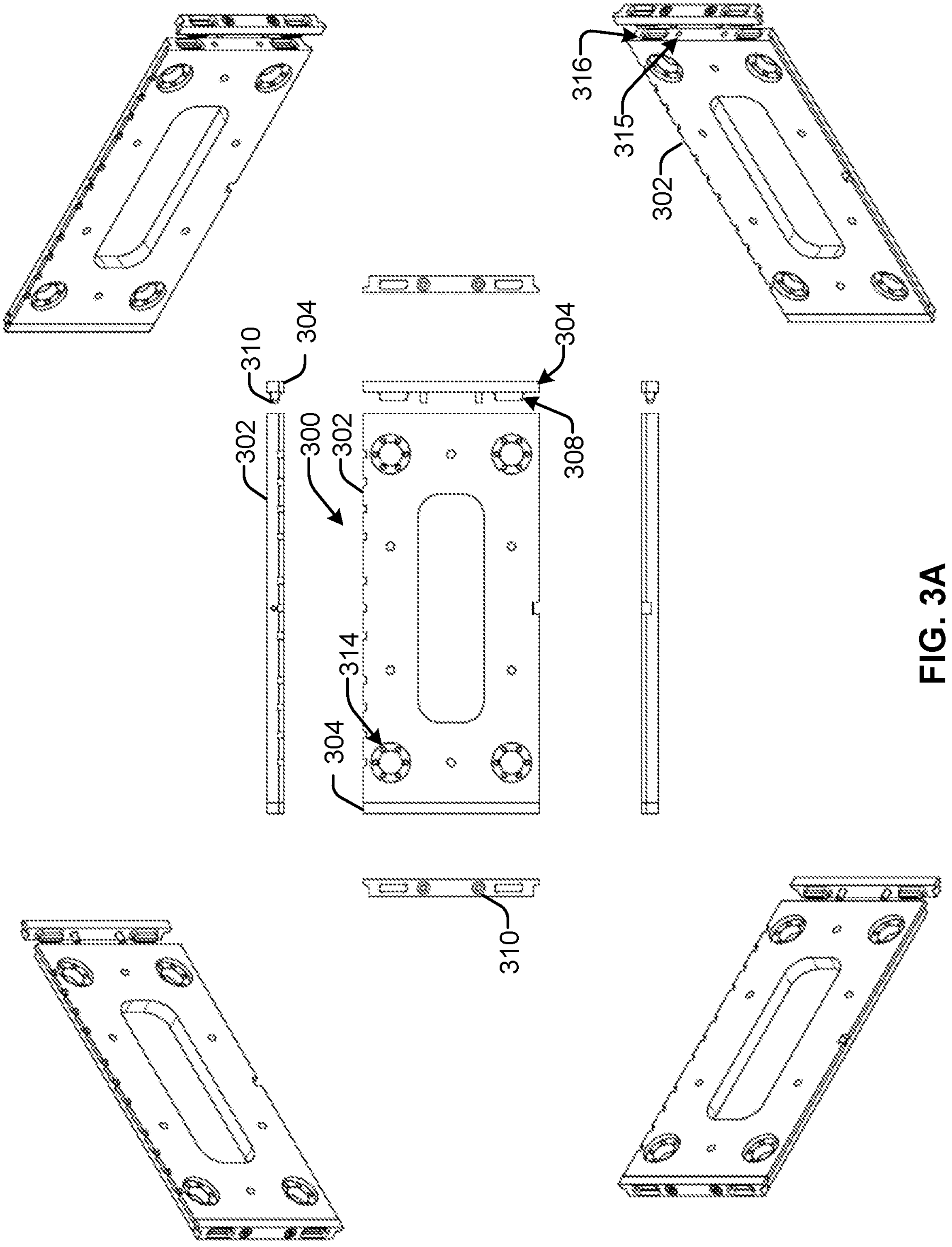
FIG. 3A illustrates yet another example modular carriage system, in accordance with aspects of this disclosure.

FIG. 3A shows another example modular carriage system 300 where a base plate 302 is configured to include one or more machined areas 316, slot or void machined in a side, and/or bottom, to receive and secure one or more modular pieces 304. Each modular piece includes an extension 308 designed to mate with the machined areas 316. One or more fasteners or posts 310 (e.g., a screw, a bolt, a stud, a post, a weld, etc.) extend from the modular pieces 304 to mate with one or more holes 315.

In some examples, the modular pieces are designed for manufacture through forging and/or casting, rather than machining. The modular pieces can be secured to the base carriage plate by welding, screwing, bolting, or other suitable means. In some examples, the base carriage plate 302 is configured to house one or more sensors within a sensor mounting area 314.

Figure 3B:
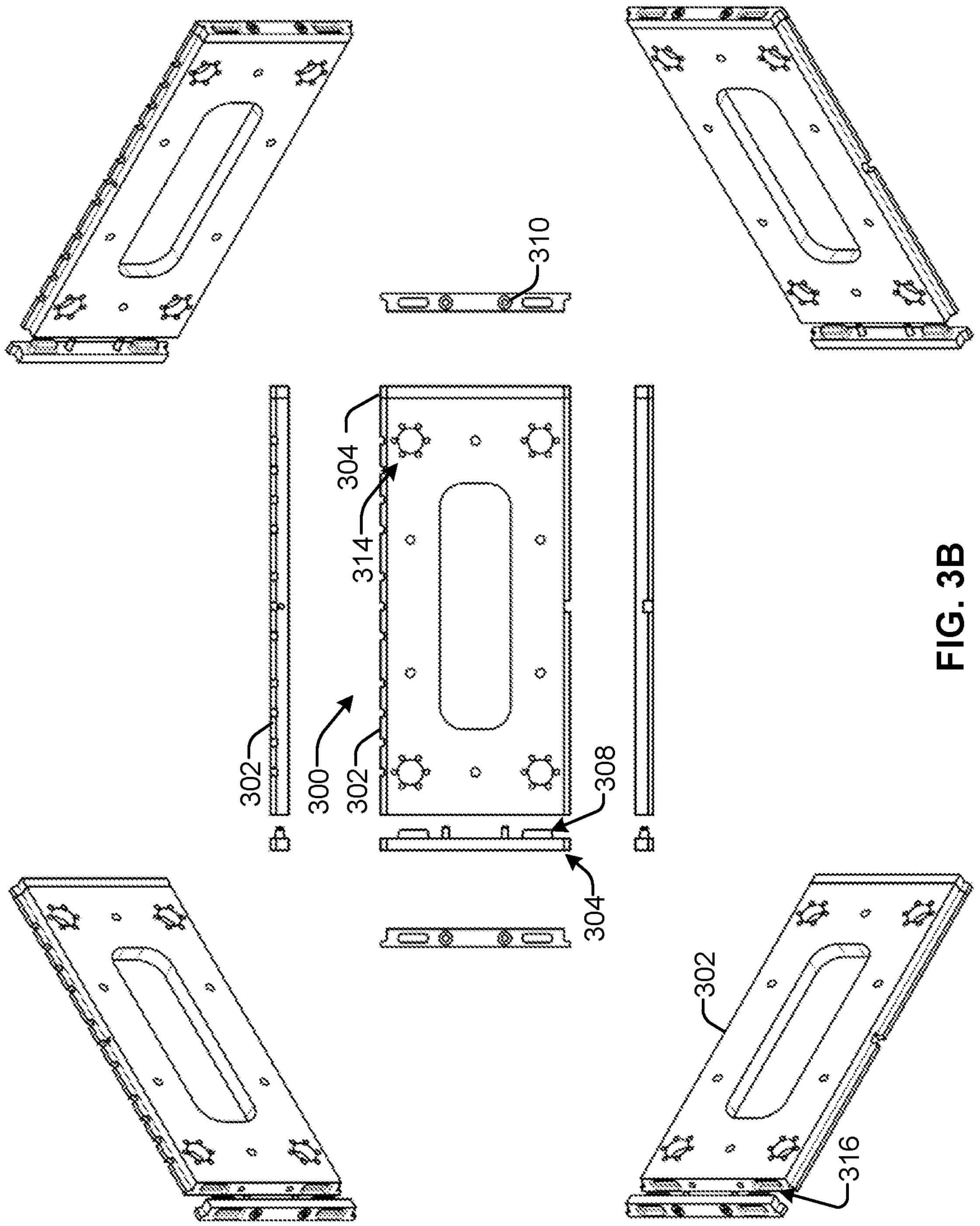
FIG. 3B illustrates a rear view of the example modular carriage system of FIG. 3A, in accordance with aspects of this disclosure.

FIG. 3B shows a rear view of the base carriage plate 302.

Figure 4A:
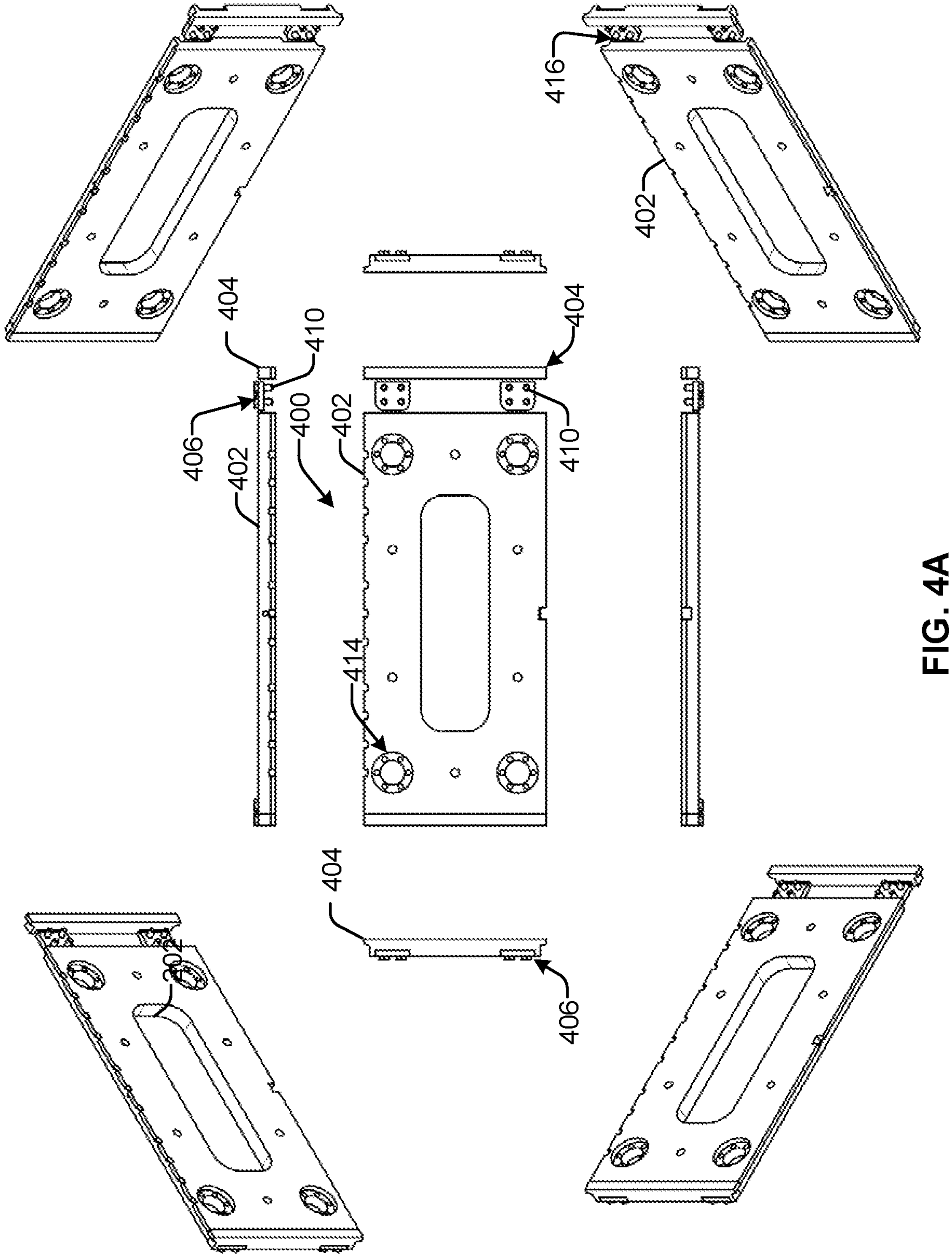
FIG. 4A illustrates yet another example modular carriage system, in accordance with aspects of this disclosure.
Figure 4B:
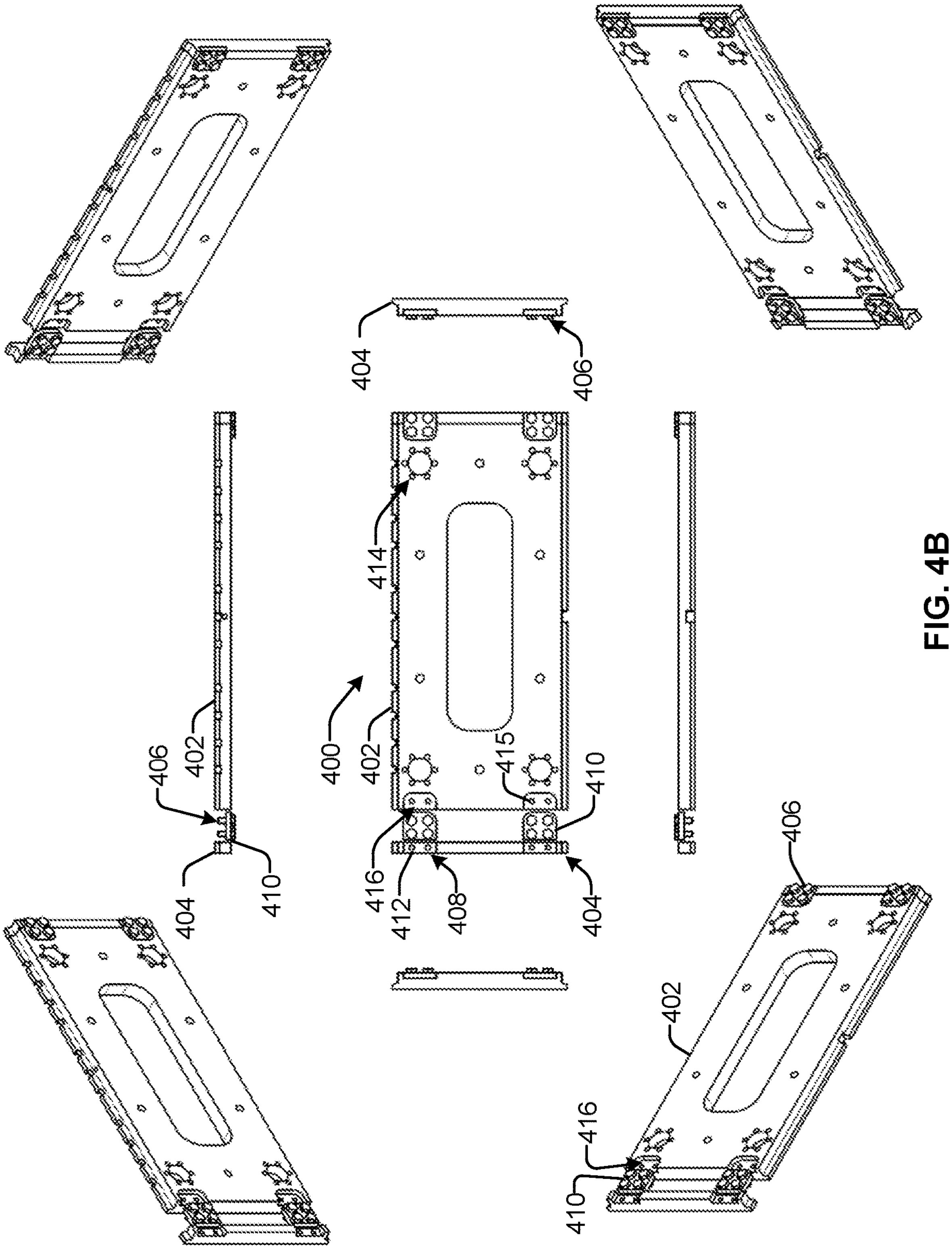
FIG. 4B illustrates a rear view of the example modular carriage system of FIG. 4A, in accordance with aspects of this disclosure.

FIG. 4A shows another example modular carriage system 400 where a base carriage plate 402 is configured to include one or more machined areas 416, slot or void machined in a side, and/or bottom, to receive and secure one or more modular pieces 404. Each modular piece includes an area 408 for receiving a plate 410. For example, the area 408 includes one or more holes 412 to receive one or more fasteners 406 (e.g., a screw, a bolt, a stud, a post, a weld, etc.) to secure the plate 410 thereto. The machined areas 416 include one or more holes 415 to receive one or more fasteners 406 to secure the plate 410 thereto.

Although illustrated as having two rows of holes to accept four fastener 406, additional holes arranged in additional rows may accept additional modular pieces in some examples. As shown, the plate 410 is designed to mate with the machined areas 416.

In some examples, the modular pieces can be secured to the base carriage plate by welding, screwing, bolting, or other suitable means. In some examples, the base carriage plate 402 is configured to house one or more sensors within a sensor mounting area 414.

Figure 5:
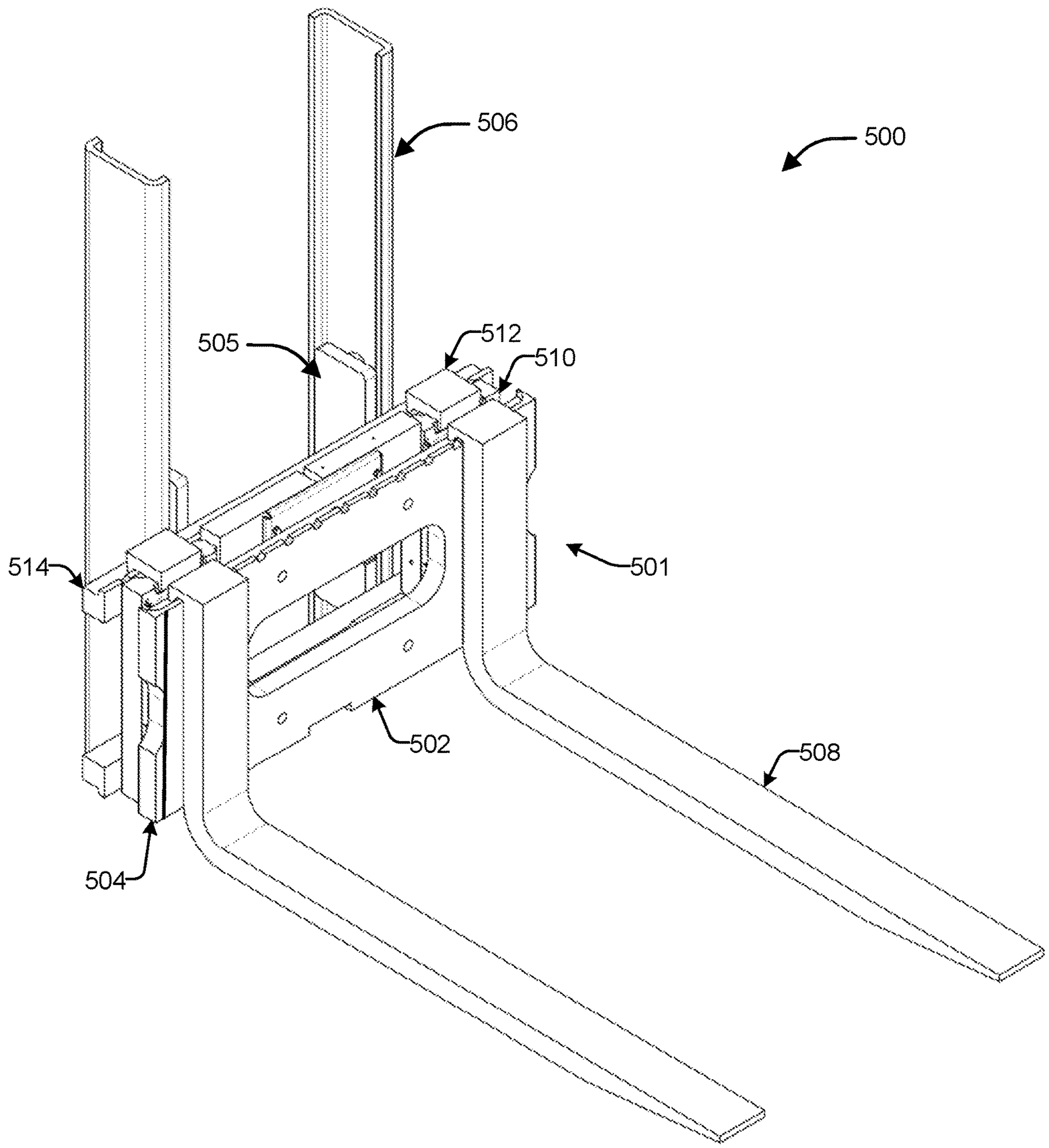
FIG. 5 illustrates an example lift truck assembly to receive an example modular carriage system, in accordance with aspects of this disclosure.

FIG. 5 illustrates an example lift truck assembly 500 to receive a carriage plate 501 that includes a base carriage plate 502 (e.g., corresponding to one or more of base carriage plates 102, 202, 302, 402) as disclosed herein.

As shown in FIG. 5, masts 506 are supported by a lift truck (not shown), which allow a lift truck carriage 505 to move via a mechanical lift in response to a user command. The carriage plate 501 is mounted to the carriage 505 by one or more rails 514. For example, a mounting plate 510 can be secured to the one or more rails 514 via a fastener, hook, or other suitable mount 512. The base carriage plate 502 is then secured to the mounting plate 510 (such as by the one or more transducers 114, 214, 314, 414). In this manner, the base carriage plate 502 is configured to support one or more forks or load handling fixtures 508. As shown, one or more modular pieces 504 can be secured to an end or edge of the base carriage plate 502. Thus, an operator can command the lift truck attachment system 500 to raise and/or lower to manipulate a load on the load handling fixtures 508 mounted to the base carriage plate 502.

Although illustrated as mounting to the carriage plate 501 to the forklift carriage 505 via one or more rails 514 external to the masts 506, any variety of mounting options are considered to secure the carriage plate 501 to the carriage 505. In some examples, the carriage plate 501 can mount to one or more rails between the masts 506.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A modular carriage system comprising:

one or more modular pieces comprising at least one extension member; and a base carriage plate configured to removably receive the one or more modular pieces at an end of the base carriage plate, the base carriage plate comprising one or more machined areas, wherein:

a first modular piece of the one or more modular pieces expands the base carriage plate in a first dimension;

a first extension member of the at least one extension members of the first modular piece extends from the first modular piece in the first dimension, the first extension member is sized and shaped to mate with a first machined area of the one or more machined areas; and mounting hardware secures the one or more modular pieces to the base carriage plate by extending through the first machined area of the base carriage plate, and secures the first extension member of the first modular piece to the base carriage plate in a second dimension different from the first dimension.

2. The modular carriage system of claim 1, wherein the mounting hardware includes one or more of a fastener, a screw, a bolt, a plate, or a weld.

3. The modular carriage system of claim 2, wherein one or more fasteners extend through the one or more modular pieces and mate with one or more holes of the base carriage plate.

4. The modular carriage system of claim 2, wherein one or more plates are secured to a surface of the one or more modular pieces and to a surface of the base carriage plate, the one or more plates secured to the one or more modular pieces of the base carriage plate by one or more screws.

5. The modular carriage system of claim 1, wherein a first modular piece of the one or more modular pieces is secured to a first side of the base carriage plate and a second modular piece of the one or more modular pieces is secured to a second side of the base carriage plate.

6. The modular carriage system of claim 5, wherein the first side of the base carriage plate is opposite the second side.

7. The modular carriage system of claim 5, wherein the first side and the second side of the base carriage plate are parallel.

8. The modular carriage system of claim 5, wherein the first side is generally perpendicular to the second side of the base carriage plate.

9. A modular carriage system comprising:

a plurality of modular pieces comprising mounting hardware; and a base carriage plate comprising an area configured to receive and secure the plurality of modular pieces to the base carriage plate via the mounting hardware, the plurality of modular pieces expand one or more dimensions of the base carriage plate, wherein a first side of a first modular piece of the plurality of modular pieces is configured to be directly secured to the base carriage plate at a vertically oriented end of the base carriage plate to extend a horizontal profile of the base carriage plate, and a second modular piece of the plurality of modular pieces is configured to be directly secured to a second side of the first modular piece opposite the first side to further extend the horizontal profile of the base carriage plate.

10. The modular carriage system of claim 9, wherein the mounting hardware of the plurality of modular pieces comprises one or more extensions extending from a surface of the plurality of modular pieces, the one or more extensions configured to mate with the area of the base carriage plate.

11. The modular carriage system of claim 9, wherein the modular carriage system is configured to mount to a lift truck attachment system for a lift truck.

12. The modular carriage system of claim 11, wherein the base carriage plate is configured to support one or more load handling fixtures.

13. The modular carriage system of claim 9, wherein the modular carriage system is configured to support a side-shifter to move the one or more load handling fixtures horizontally.

14. The modular carriage system of claim 9, wherein the one or more modular pieces are configured to house one or more of sensors, wiring or electronics.

15. A modular carriage system comprising:

one or more modular pieces; and a base carriage plate configured to removably receive the one or more modular pieces at a first end of the base carriage plate facing a first direction and at a second end of the base carriage plate opposite the first end and facing a second direction, the base carriage plate having one or more machined areas, wherein:

a first modular piece of the one or more modular pieces comprises one or more first extensions sized and shaped to mate with one or more a respective first machined areas of the one or more machined areas on the first end of the base carriage plate, such that the first modular piece extends the base carriage plate in the first direction;

mounting hardware is configured to secure the first modular piece to the base carriage plate by extending through at least one of the one or more first machined areas the base carriage plate and at least one of the one or more first extensions of the first modular piece;

a second modular piece of the one or more modular pieces comprises one or more second extensions sized and shaped to mate with one or more respective second machined areas of the one or more machined areas on the second end of the base carriage plate, such that the second modular piece extends the base carriage plate in a second direction; and a third modular piece of the one or more modular pieces is configured to directly couple to the first modular piece or the second modular piece to further extend the base carriage plate in the first direction or the second direction.

16. The modular carriage system of claim 15, wherein the base carriage plate comprises one or more carriage holes, each modular piece of the one or more modular pieces further comprises a fastener extending from the modular piece, and each modular piece of the one or more modular pieces is attached to the base carriage plate by the fastener of the modular piece mating with a respective carriage hole of the one or more carriage holes.

17. The modular carriage system of claim 15, wherein the one or more modular pieces include two or more modular pieces configured to be secured to each other and the base carriage plate at a vertically oriented end of the base carriage plate to extend a horizontal profile of the base carriage plate.

18. The modular carriage system of claim 15, wherein the base carriage plate comprises a carriage hole, such that a fastener secures the base carriage plate to a modular piece of the one or more modular pieces by extending through the carriage hole and the one or more extension.

* * * * *